United States Patent
Fung et al.

(10) Patent No.: US 9,300,880 B2
(45) Date of Patent: Mar. 29, 2016

(54) METHODS AND SYSTEMS FOR PROVIDING SENSOR DATA AND IMAGE DATA TO AN APPLICATION PROCESSOR IN A DIGITAL IMAGE FORMAT

(71) Applicant: Google Technology Holdings LLC, Mountain View, CA (US)

(72) Inventors: James Fung, Sunnyvale, CA (US); Johnny Lee, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 108 days.

(21) Appl. No.: 14/145,522

(22) Filed: Dec. 31, 2013

(65) Prior Publication Data

US 2015/0189190 A1   Jul. 2, 2015

(51) Int. Cl.
  *H04N 5/262* (2006.01)
(52) U.S. Cl.
  CPC ..................... *H04N 5/262* (2013.01)
(58) Field of Classification Search
  CPC .... H04N 5/262; H04N 5/2621; H04N 5/2628
  USPC .......................................... 348/231.99–231.6
  See application file for complete search history.

(56) References Cited

U.S. PATENT DOCUMENTS 5,737,491 A * 4/1998 Allen et al. .................... 704/270
6,104,430 A * 8/2000 Fukuoka .................... 348/231.6
2009/0174783 A1 7/2009 Nomura et al.
2011/0069229 A1 3/2011 Lord
2011/0234825 A1 9/2011 Liu et al.
2013/0215295 A1 8/2013 Baek et al.
2013/0222426 A1 8/2013 Hymel
2015/0237223 A1 8/2015 Fung et al.

FOREIGN PATENT DOCUMENTS

JP    2004-120611 A    4/2004
KR  10-2005-0058886 A  6/2005

OTHER PUBLICATIONS

International Search Report from corresponding International Application No. PCT/US2014/072510 mailed Mar. 24, 2015.
Written Opinion from corresponding International Application No. PCT/US2014/072510 mailed Mar. 24, 2015.
Non-Final Office Action mailed Jul. 16, 2015 for U.S. Appl. No. 14/185,091, 18 pages.

* cited by examiner

*Primary Examiner* — Tuan Ho

(57) ABSTRACT

Methods and systems for providing sensor data and image data to an application processor on a mobile device are described. An example method involves receiving image data from at least one camera of the mobile device and receiving sensor data from an inertial measurement (IMU) of the mobile device. The method further involves generating a digital image that includes at least the image data and the sensor data. The sensor data may be embedded in pixels of the digital image, for instance. Further, the method then involves providing the digital image to an application processor of the mobile device using a camera bus interface. Thus, the sensor data and the image data may be provided to the application processor in a single data structure.

21 Claims, 7 Drawing Sheets

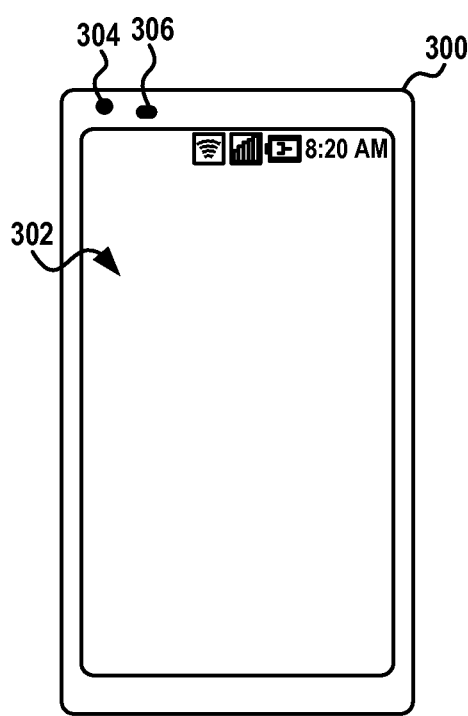
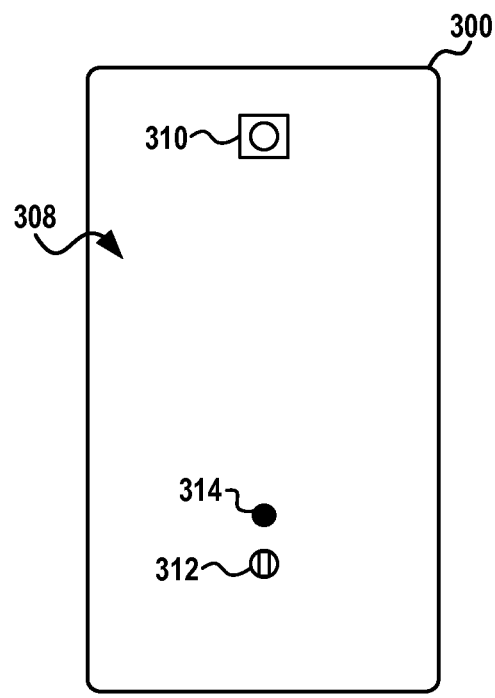
FIG. 3A     FIG. 3B

METHODS AND SYSTEMS FOR PROVIDING SENSOR DATA AND IMAGE DATA TO AN APPLICATION PROCESSOR IN A DIGITAL IMAGE FORMAT

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging and positioning. A few examples of sensors that may be found in a mobile device include accelerometers, gyroscopes, magnetometers, barometers, global positioning system (GPS) receivers, microphones, cameras, Wi-Fi sensors, Bluetooth sensors, temperature sensors, and pressure sensors, among other types of sensors.

The wide variety of available sensors enables mobile devices to perform various functions and provide various user experiences. As one example, a mobile device may use imaging and/or positioning data to determine a trajectory of the mobile device as a user moves the mobile device through an environment. As another example, a mobile device may use imaging and/or positioning data to perform an odometry process (i.e., determining a position and orientation of the mobile device in an environment). As yet another example, a mobile device may use imaging and/or positioning data to generate a 2D or 3D map of an environment, or determine a location of a mobile device within a 2D or 3D map of an environment. As a further example, a mobile device may use imaging and/or positioning data to facilitate augmented reality applications. Other examples also exist.

SUMMARY

In examples in which a mobile device relies on data from two or more sensors to perform a particular function (e.g., trajectory determination, odometry, map generation, etc.), it can be beneficial to provide data from each of the sensors to an application processor within a single data structure. Providing data from each of the sensors within a single data structure may reduce/eliminate delay between a time when data from a first sensor is provided and a time when data from a second sensor is provided. Furthermore, providing data from each of the sensors within a single data structure may help ensure that data from each of the sensors corresponds to data collected during the same instance in time or a same time period.

Described herein are methods and systems for providing sensor data and image data to an application processor on a mobile device within a single data structure. In examples, methods and systems for providing sensor data and image data within a digital image are provided. Furthermore, in some examples the sensor data and image data can be provided to the application processor over a camera bus interface for quickly transmitting a large amount of data.

In one example aspect, a method is provided. The method involves receiving, by a processor of a mobile device, image data from at least one camera of the mobile device and sensor data from an inertial measurement unit (IMU) of the mobile device. The method also involves generating, by the processor, a digital image that includes at least the image data and the sensor data. The sensor data is embedded in pixels of the digital image. The method further involves providing, by the processor, the digital image to an application processor of the mobile device using a camera bus interface.

In another example aspect, a processing unit in a mobile device is provided. The processing unit includes a data storage and instructions stored in the data storage and executable by the processing unit to perform functions. The functions include receiving image data from at least one camera of the mobile device and sensor data from an IMU of the mobile device. The functions also include generating a digital image that includes at least the image data and the sensor data. The sensor data is embedded in pixels of the digital image. The functions further include providing the digital image to an application processor of the mobile device using a camera bus interface.

In still another example aspect, a mobile device is provided. The mobile device includes an application processor, at least one camera, an IMU, and a processor. The processor is configured to receive image data from the at least one camera and sensor data from the IMU. The processor is also configured to generate a digital image that includes at least the image data and the sensor data. The sensor data is embedded in pixels of the digital image. The processor is further configured to provide the digital image to the application processor using a camera bus interface.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 3A-3B are conceptual illustrations of an example computing device.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing sensor data and image data to an application processor on a mobile device. An example method that may be carried out by a processor of the mobile device involves receiving image data from at least one camera of the mobile device and receiving sensor data from an IMU of the mobile device. A digital image that includes at least the image data and the sensor data can then be generated by the processor. By way of example, the processor can generate a digital image including the image data, and embed the sensor data within pixels of the digital image. After generating the digital image, the processor can then provide the digital image to the application processor using a camera bus interface.

In further examples, the digital image may include additional data, such as 3D depth data, computer-vision data, time stamp information, or other types of sensor data. Additionally, in some examples, the processor may arrange the data within the digital image in a particular manner, such that data that is light (e.g., small in terms of memory size) and time sensitive for performing a particular function is provided at a top or beginning of the digital image and data that is larger and less time sensitive is provided thereafter. As a result, the application processor may receive the light and time sensitive data first, and can begin processing the data without waiting for the entire digital image to be received.

Additional example methods as well as example devices (e.g., mobile or otherwise) are described hereinafter with reference to the accompanying figures.

Figure 1:
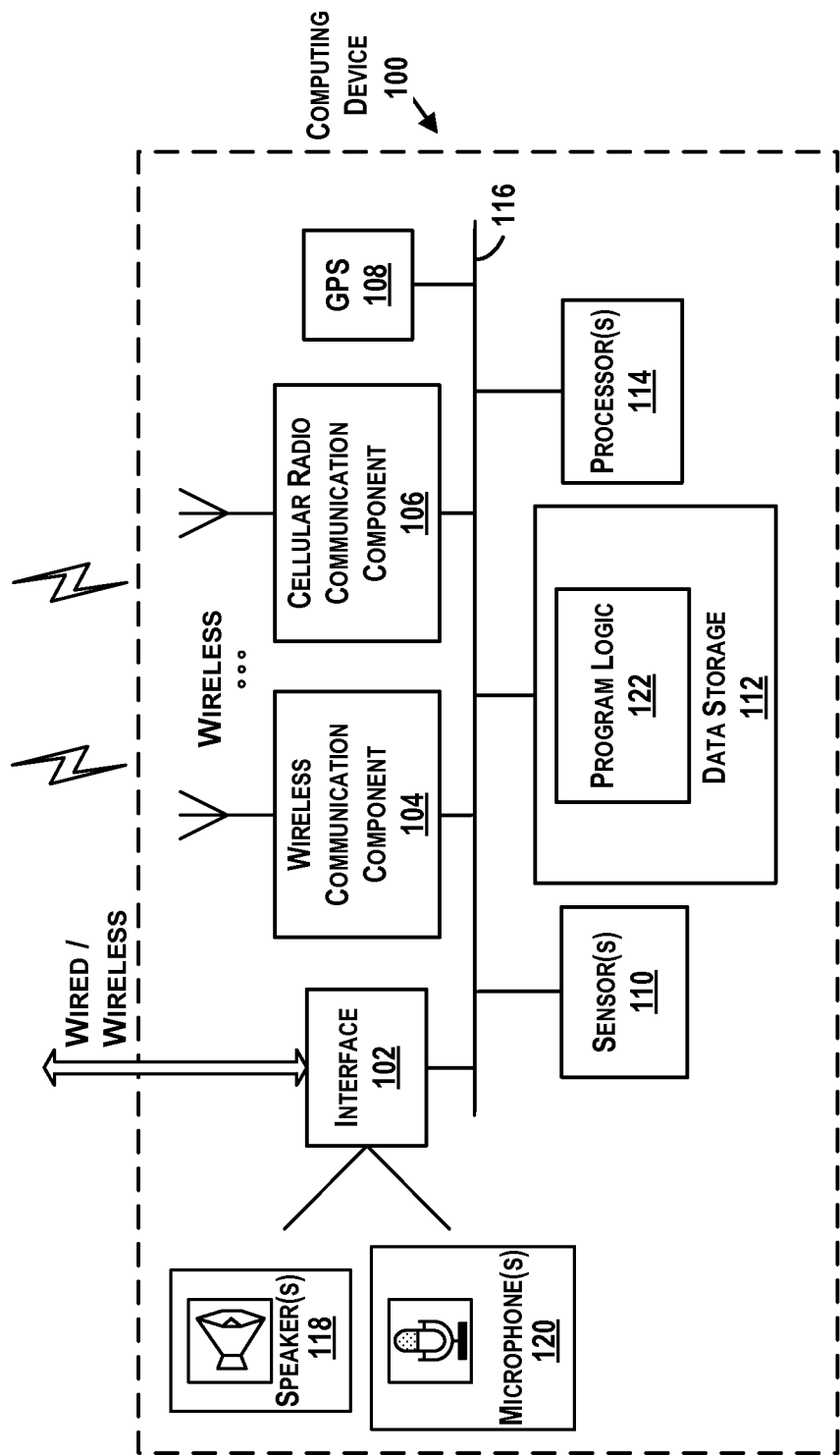
FIG. 1 illustrates an example computing device.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

Figure 2:
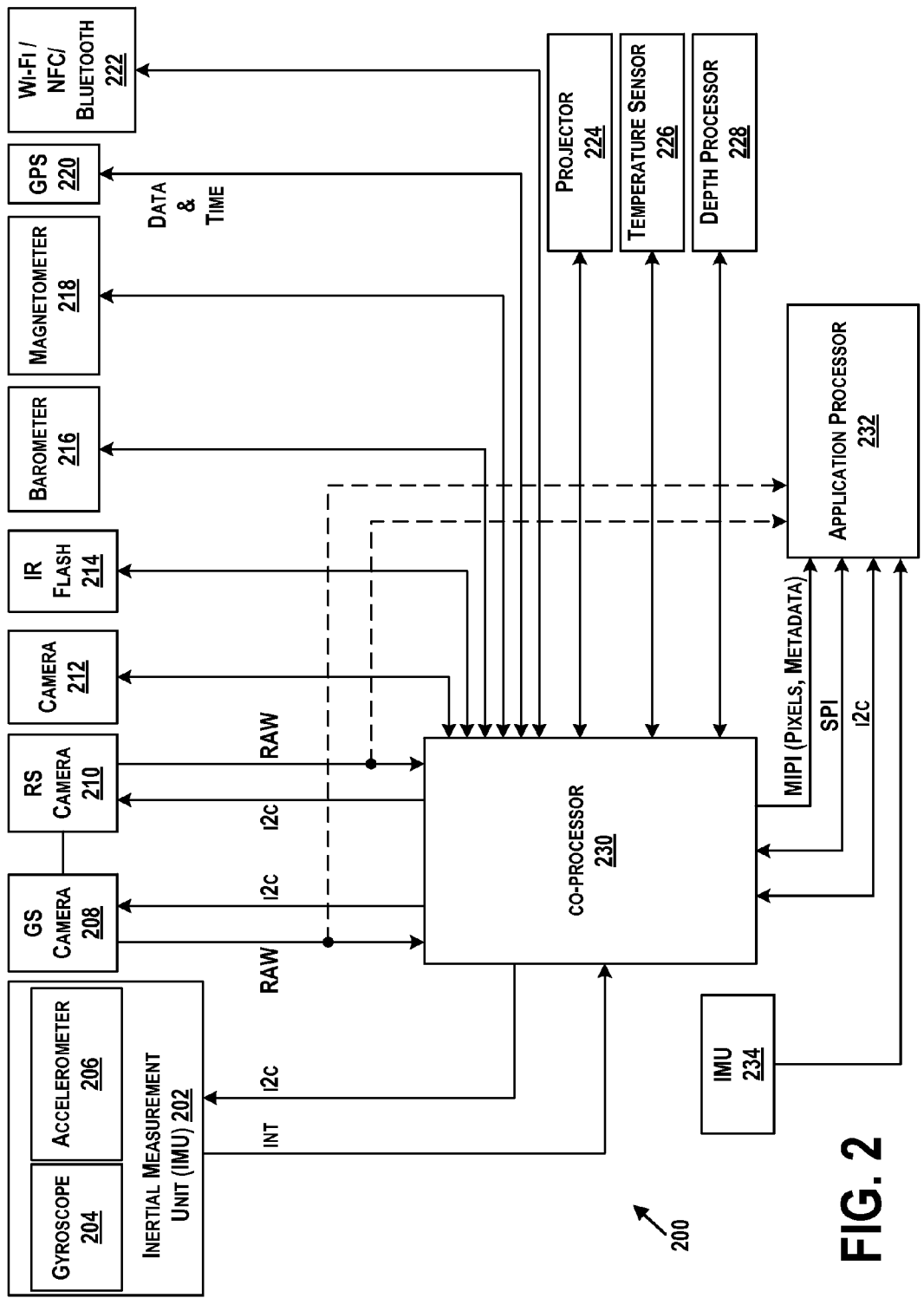
FIG. 2 illustrates another example computing device.

The computing device 100 may include more or fewer components. Further, example methods described herein may be performed individually by components of the computing device 100, or in combination by one or all of the components of the computing device 100. FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a Wi-Fi/NFC/Bluetooth sensor 222, a projector 224, and a temperature sensor 226, each of which outputs to a co-processor 230. Additionally, the computing device 200 is shown to include a depth processor 228 that receives input from and outputs to the co-processor 230. And the co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

FIGS. 3A-3B are conceptual illustrations of a computing device 300 that show a configuration of some of the sensors on the computing device 300. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202.

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The Wi-Fi/NFC/Bluetooth sensor 222 may include wireless communication components configured to operate according to Wi-Fi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the RS camera 210 may be an RGB-IR camera that is configured to capture one or more images of the dot pattern and provide image data to the depth processor 228. The depth processor 228 may then be configured to determine distances to and shapes of objects based on the projected dot pattern. By way of example, the depth processor 228 may be configured to cause the projector 224 to produce a dot pattern and cause the RS camera 210 to capture an image of the dot pattern. The depth processor may then process the image of the dot pattern, use various algorithms to triangulate and extract 3D data, and output a depth image to the co-processor 230.

The temperature sensor 226 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
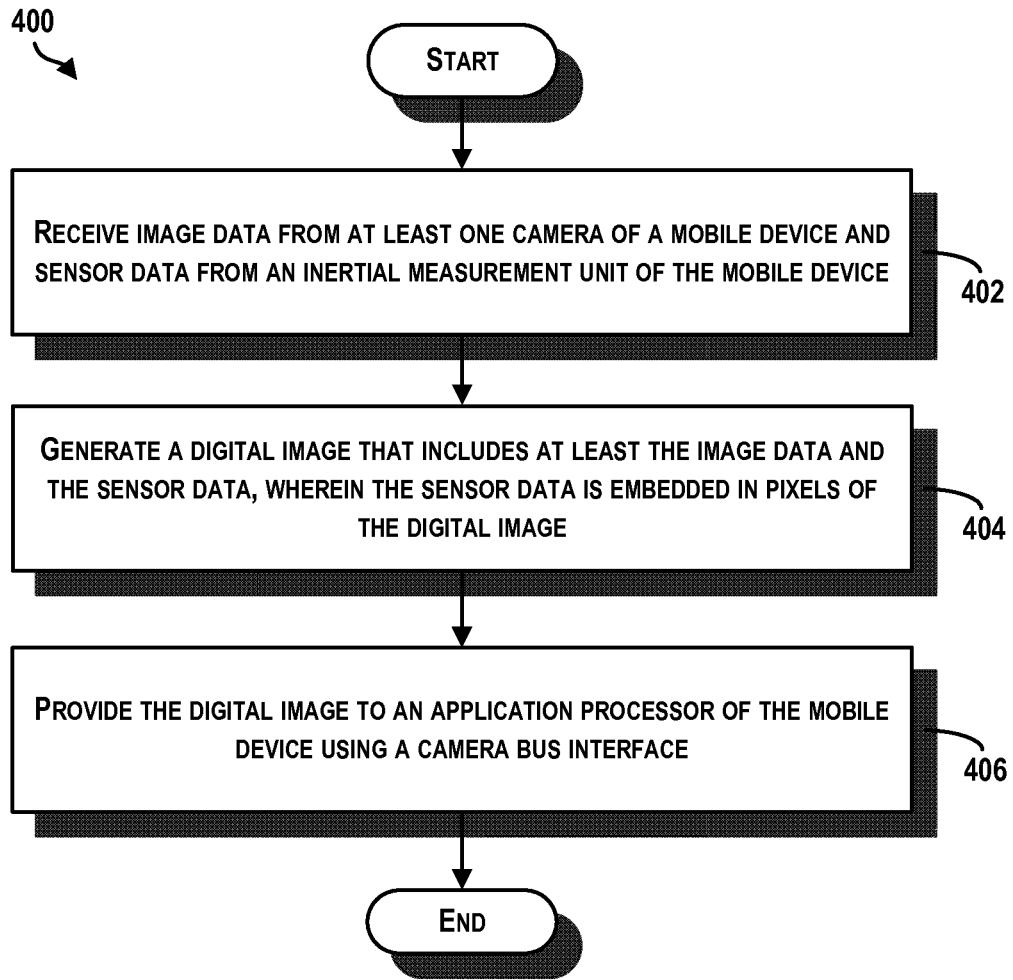
FIG. 4 is a block diagram of an example method for providing sensor data and image data to an application processor.

FIG. 4 is a block diagram of an example method 400 for providing sensor data and image data to an application processor. Method 400 shown in FIG. 4 presents an embodiment of a method that could be used or implemented by the computing device 100 of FIG. 1 or the computing device 200 of FIG. 2, for example, or more generally by one or more components of any computing device. For simplicity, the method 400 will be described as being performed by the co-processor 230 of FIG. 2. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

Initially, at block 402, the method 400 includes receiving image data from at least one camera of a mobile device and sensor data from an IMU of the mobile device. In one example, the co-processor 230 of FIG. 2 may receive image data from at least one camera (e.g., the GS camera 208, the RS camera 210, or the camera 212 of FIG. 2). The image data may be any resolution. In an example in which the co-processor 230 receives image data from two or more cameras, the image data from each of the cameras may be the same resolution or the image data from each of the cameras may be of different resolutions. The image data may include pixels that are defined in an RGB color space, for example, or more generally, any color space.

Additionally, the co-processor 230 may receive sensor data from an IMU, such as the IMU 202 of FIG. 2. By way of example, the sensor data from the IMU may be raw accelerometer data, gyroscope data, and/or magnetometer data. For instance, the sensor data from the accelerometer, gyroscope, or magnetometer may be one or more acceleration readings in one or a combination of an x-axis, y-axis, and z-axis of the mobile device. As an example, an individual accelerometer, gyroscope, or magnetometer reading may be a 16-bit raw sensor value composed of an 8-bit high number (high byte) and an 8-bit low number (low byte). However, the example is not meant to be limiting, and other examples are also possible.

In some instances, co-processor 230 may receive sensor data from other sensors instead of or in addition to the sensor data from the IMU. For instance, co-processor 230 may receive sensor data from any of the sensors of FIG. 2, or any type of sensor of a mobile device.

The co-processor 230 may be configured to trigger sensor or camera operation on demand, or the sensors and cameras may be configured to run in a free running mode. For instance, if the co-processor 230 receives a request for a digital image, the co-processor 230 may trigger each of the sensors and cameras to cause the necessary data to be obtained at a desired instance in time. Alternatively, the co-processor 230 may cause the sensors and cameras to free-run, and when data is received, the co-processor 230 may time stamp the data to indicate when the data was received. For example, if the co-processor 230 is unable to trigger a sensor or camera to obtain data at a specific time, the co-processor 230 may request that the camera or sensor provide the most recently obtained data. Similarly, the co-processor 230 may trigger some of the sensors or cameras to obtain data at a specific instance in time while allowing other sensors or cameras to operate in a free-running mode.

At block 404, the method 400 includes generating a digital image that includes at least the image data and the sensor data. In one example, the co-processor 230 may generate a single digital frame that includes at least the image data and the sensor data. In some instances, the image data received by the processor may include pixels that are defined in a RGB color space, and the processor may be configured to convert the pixels of the image data to a YUV color space. The converted pixels of the image data can then be added to the digital image.

Additionally, the co-processor 230 may be configured to represent the sensor data as fake pixels in the digital frame (i.e., pixels whose values have been defined by a processor to represent a portion of a sensor value). By way of example, the digital image may include pixels that are defined in a brightness and chrominance (YUV) color space. A 16-bit raw sensor value can then be embedded in a "Y" space of two pixels. For instance, eight bits of the 16-bit raw sensor value can be represented in a "Y" space of a first pixel and the remaining eight bits can be embedded in a "Y" space of a second pixel. Values in the "U" space and the "V" space of the pixels can be set to zero in order to ensure that the sensor value is not skewed during image compression or packing, for example.

As another example, a 32-bit single-precision floating point number can be represented in the "Y" space of four separate 8-bit pixels, while values in the "U" space and the "Y" space can be set to zero. Other examples are also possible depending on the number of bytes per pixel and/or color space utilized by the digital image. For instance, the sensor data may be embedded in the "U" space or "V" space instead of the "Y" space. Thus, the examples are not meant to be limiting.

At block 406, the method 400 includes providing the digital image to an application processor of the mobile device using a camera bus interface. In one example, the camera bus interface may be a mobile industry processor interface (MIPI). In some instances, the digital image can be provided by the co-processor 230 to the application processor row by row. Accordingly, the processor may arrange the sensor data and image data in a particular manner with respect to one another. For instance, the processor may embed the sensor data in one or more rows of pixels that are provided to the application processor before rows of pixels that include the image data if the sensor data is deemed to be more time-sensitive than the image data.

In a further example of the method 400, the co-processor may be configured to determine one or more time stamps associated with the sensor data, and embed the determined time stamp(s) in multiple pixels of the digital image. The time stamp may indicate a time when the sensor data was collected, for example. In one instance, the received sensor data itself may include time stamp information. In another instance, the co-processor may be configured to record the time stamp information. For example, upon receiving the sensor data from the IMU or upon sending a request for the IMU to collect sensor data to the IMU, the co-processor may access a system clock to determine a current time.

In a similar example, the co-processor may also be configured to determine one or more frame counters associated with the image data. For example, for each frame of image data received by the co-processor, the co-processor may assign a frame number to the image data. The co-processor may then embed the frame number in one or more locations of the image when the frame of image data is added to the digital image. For instance, the co-processor may be configured to embed a frame number in one or more corner pixels of a given image (e.g., top-left corner pixel, top-right corner pixel, bottom-left corner pixel, bottom-right corner pixel). All of the frame counters for the given image that are embedded within the digital image may be the same (e.g., each frame counter may indicate the same frame number). Therefore, when a processor such as the application processor receives the digital image, the application processor may be able to determine that all of the image data corresponds to the same frame. If, for instance, one or more of the frame numbers for the image do not agree, the application processor may request that the co-processor regenerate and/or resend the digital image with the correct image data.

In still another example of the method 400, the co-processor may be configured to receive depth data from a depth processor, such as the depth processor 228. By way of example, the depth data may be a depth image that includes color information as well as corresponding depth information for each pixel of the image. The depth information may indicate a distance to an object in the environment for each pixel of the image, for instance. In such an example, the co-processor may be configured to include the depth data in the digital image in addition to the sensor data and the image data.

In yet another example of the method 400, the co-processor may be configured to determine computer-vision data using the received image data. The computer-vision data may include one or more image features of an image that are determined based on feature detection methods or algorithms. In computer vision, feature detection refers to the computation of abstractions of image information in order to identify an "interesting" part of an image.

Example types of image features include edges, corners/interest points, and blobs. An edge is a point in an image where there is a boundary between two image regions. Corners, or more generally interest points, refer to point-like features in an image which have a local two-dimensional structure. Algorithms such as the Harris & Stephens algorithm can be used to detect edges and corners. The Features from Accelerated Segment Test (FAST) algorithm is another example of an algorithm that may be used to detect corners and interest points. Finally, blobs describe regions of interest in an image (e.g., regions that are too smooth to be detected by a corner detector). The FAST algorithm, among others, can also be used to detect blobs.

In another example of the method 400, the co-processor may be configured to determine computer-vision data using received depth data. As an example, the co-processor may process the depth data in order to extract planes, shapes, corners, or other types of geometric data. For instance, the co-processor may execute one or more algorithms in order to measure and an identify a corner of a wall in a room, identify one or more shapes such as spheres, cubes, etc., or identify and extract a floor plane from the depth data.

In another example of the method 400, the co-processor may be configured to generate an image that includes both color and depth data that are correlated. For instance, the co-processor may be configured to combine image data and depth data to produce a combined color and depth image (e.g., an RGB-D image, in which "D" refers to a depth or distance associated with a pixel or group of pixels). As one example, a combined color and depth image may include synchronized data from a 640×480 RGB camera (such as the GS camera 208 or the RS camera 210) and depth camera. The combined color and depth image may also be included in the generated digital image.

In another example of the method 400, the co-processor may be configured to cross-validate different types of data with each other and determine quality levels of the data. For instance, the co-processor may perform sensor fusion across multiple modalities in order to cross-validate and evaluate the sensor data, depth data, and/or image data. As one example, the co-processor may determine whether sensor data from an accelerometer and a barometer are indicative of the same change in motion of the mobile device (e.g., are indicative that the mobile device has moved up by five inches). Similarly, the co-processor may determine whether IMU data is consistent with a change in the location of image features between two images.

In still another example of the method 400, the co-processor may be configured to generate a digital image that includes redundant data. For instance, instead of only sending data that corresponds to a single instance in time, the digital image may include data that corresponds to the instance in time as well as data from the previous ten generated digital images. In one instance, only the sensor data may be redundantly sent. In other instances, any or all of the data may be redundantly sent. Therefore, a given digital image may include, for example, depth data corresponding to the last ten digital images. The application processor may access the redundant data if, for instance, a data segment or an entire digital image for a given instance in time is corrupted or includes errors.

In some instances, generating a digital image that includes data from different types of sensors may allow the application processor to perform unique functions. For example, if the digital image includes image data as well as depth data and/or sensor data collected at the same time or during the same time period, the application processor can extract the sensor data from the digital image and process the sensor data in conjunction with the image data to perform one or more computer vision functions. By way of example, the application processor may compare the an image in the digital image to a previous image and, based on the IMU data, estimate a change in orientation or position of the mobile device that explains any changes between locations of features in the images.

In other instances, the size of the digital image may be adjustable depending on the available sensor data. For example, if one or more sensors of the mobile device, such as a GPS receiver, are unable to output data at a given time, the digital image for that time may not include any GPS data.

In some examples, the co-processor and/or the application processor may store and repeatedly overwrite copies of a predetermined number of recent digital images in memory. For example, the application processor may store the last five digital images received from the co-processor in a memory. The application processor may then access the stored digital images to recreate a timeline of sensor data or image data if desired.

Figure 5:
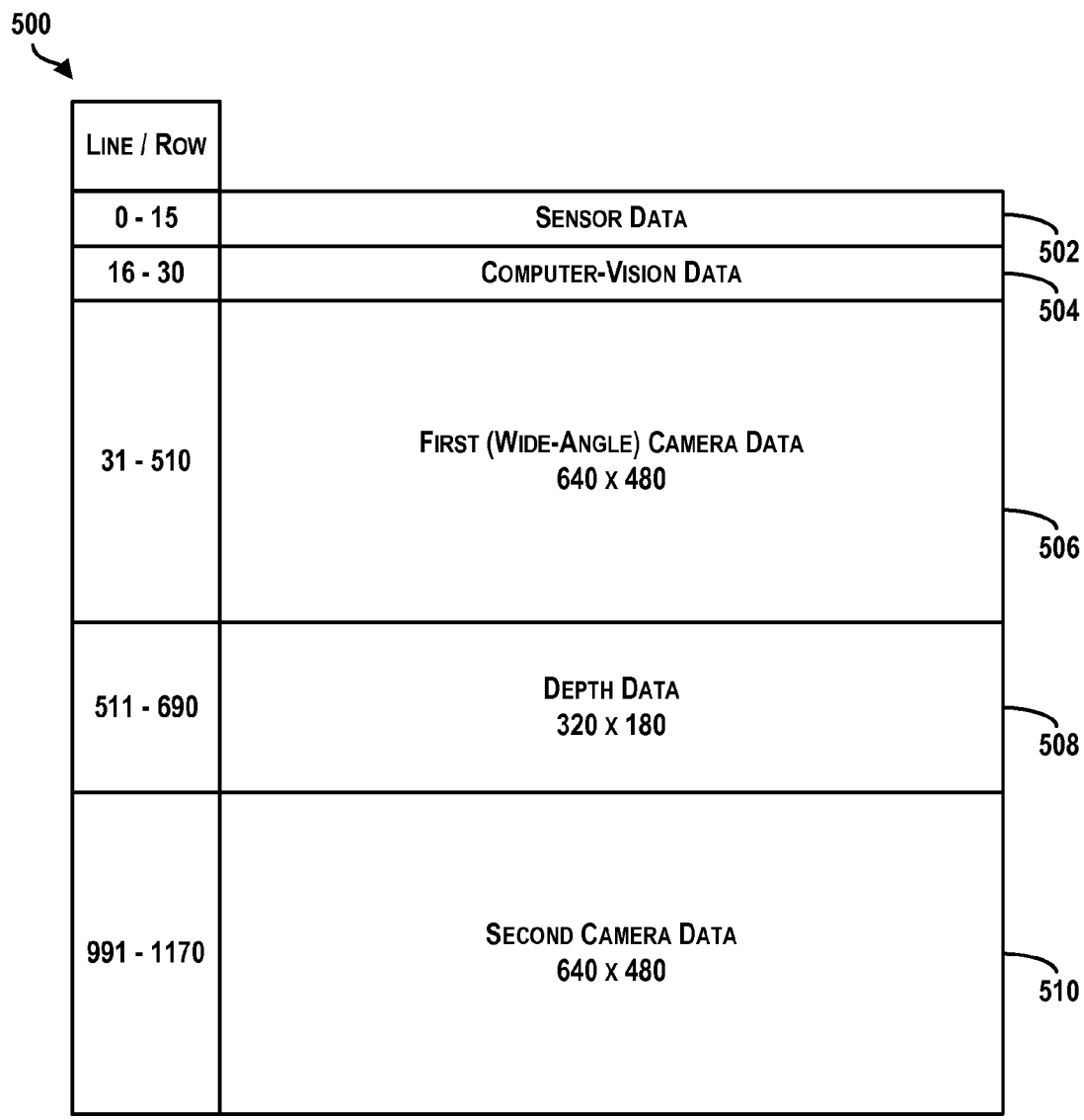
FIG. 5 is a conceptual illustration of an example digital image format.

Turning now to FIG. 5, a conceptual illustration 500 of an example digital image format is shown. The conceptual illustration 500 is shown for purposes of example only, and is not meant to be limiting in any manner. Other configurations and formats for the digital image are also contemplated.

As shown in FIG. 5, the example digital image format includes sensor data 502, computer-vision data 504, first camera data 506, depth data 508, and second camera data 510. The sensor data 502 is shown within the first sixteen rows of a digital image. Thereafter, in the next few rows, the computer-vision data 504 is provided. Consequently, in an example in which the digital image is provided to the application processor row by row, the sensor data 502 would first be provided, followed by the computer-vision data 504.

Below the sensor data 502 and computer-vision data 504, which are shown as occupying 31 rows in the example digital image format 500, larger data sources are provided. The larger data sources include the first camera data 506, followed by the depth data 508, and the second camera data 510. In one example, the first camera data 506 may be an image from a first camera having a field of view that is greater than 120 degrees, such as the GS camera 208 of FIG. 2. Further, the second camera data may be an image from a second camera having a smaller field of view, such as the RS camera 210 of FIG. 2.

Note that the example digital image format shown in FIG. 5 is just one example. In other instances, other digital image formats may be utilized. For instance, the first camera data 506 and the second camera data 510 may be located side-by-side within rows 31-510 of a digital image (not shown). Similarly, in other example digital image formats, more or less data may be provided. For instance, in another digital image format the depth data or the computer-vision data may be omitted, or third camera data from a third camera may also be included. As another example, in another digital image format, a combined color and depth image may be provided in addition to or in place of the first camera data 506, the depth data 508, and/or second camera data 510.

In another example digital image format, the digital image may include padding between one or more of the different data segments. For example, the digital image may be padded with blank or empty data in between the first camera data 506 and the depth data 508 or between the depth data 508 and the second camera data 510. In some instances, the padding between the different data segments may be inserted in order to make sure that the beginning of each data segment corresponds to the beginning of a sector or subdivision of a track in a memory.

As an example, padding may be inserted between data segments to make sure that the beginning of the first camera data 506 corresponds to the beginning of a 4096-byte (4K) sector. This may allow the first camera data 506 to be written more efficiently to memory. Similarly, the digital image may be padded such that the beginning of each of the depth data 508 and second camera data 510 corresponds to the beginning of a 4K sector.

In another example digital image format, the width of the digital image may be 1280 pixels. As a result, each row of the digital may include two rows of pixel data from the first camera data. The rows may be organized side-by-side. For example, columns 0-639 of row 31 of the digital image may include a first row of pixels of the first camera data 506 and columns 640-1279 or row 31 may include a second row of pixels of the first camera data 506. Similarly, a single row of the digital image may include 4 rows of depth data 508 or two rows of pixels of second camera data 510.

As discussed above, frame numbers may also be include at the beginning and end of the digital frame and/or at the beginning or end of each data segment (not shown). The frame numbers may enable an application processor to confirm that data of a received digital image all corresponds to the same digital image, rather than a previously received digital image, for example.

In another example digital image format, the digital image may include encoded pixel information that identifies whether a particular segment of data is new or stale. For instance, if the depth data 508 is captured at 5 Hz, the first camera data is captured at 30 Hz, and the digital image is generated at 30 Hz, it may be possible that depth data for a given digital image is the same depth data that was provided in a previous digital image. Accordingly, if the depth data 508 is newly acquired, a flag may be set to indicate that the depth data 508 is new. On the other hand, if the depth data 508 is stale, the flag may not be set, indicating that the depth data 508 is not new.

Figure 6:
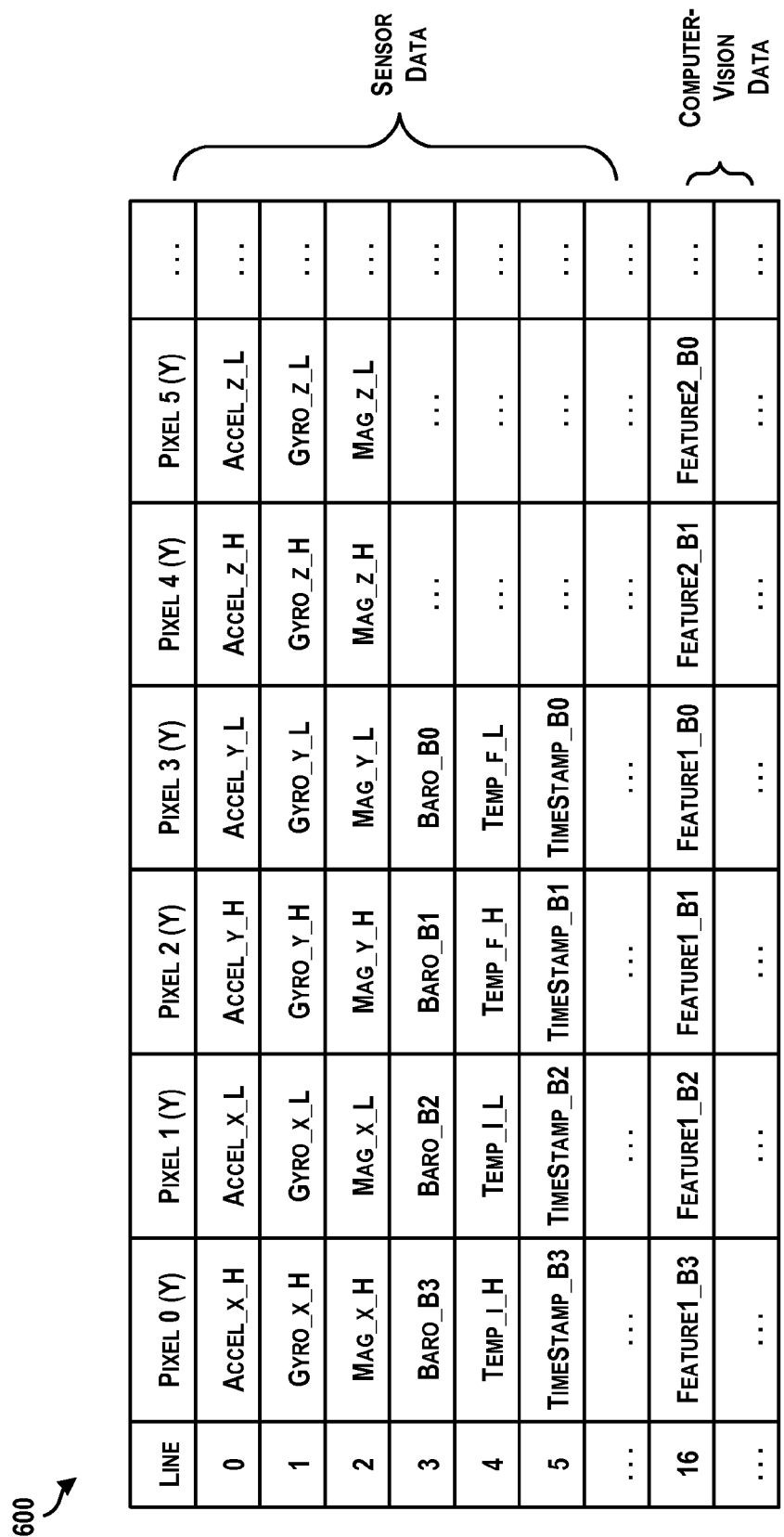
FIG. 6 is a conceptual illustration of example sensor data formats and example computer-vision data formats.

In FIG. 6, a conceptual illustration 600 of example sensor data formats is provided. As shown in FIG. 6, accelerometer data is provided in a first line (e.g., a first row of pixels) of a digital image. In particular, the eight highest bits of a 16-bit x-axis acceleration value (i.e., a high byte) are shown within the "Y" space of a first pixel while the eight lowest bits of the 16-bit x-axis acceleration value (i.e., a low byte) are shown within the "Y" space of a second pixel. Similarly, y-axis acceleration values and z-axis acceleration values are shown in the "Y" space of pixels 2-3 and 4-5 respectively. Furthermore, gyroscope data and magnetometer data are also embedded within the "Y" space of pixels 0-5 of lines 1 and 2.

The barometer reading is shown as four separate bytes (B3, B2, B1, and B0) that, when combined, represent a 32-bit number. In line 4, an integer component of a temperature reading is shown in the "Y" space of pixels 0-1, while a fraction component of the temperature reading is shown in the "Y" space of pixels 2-3. Additionally, a time stamp that has been divided into four eight bit values is also shown in line 5. In other examples, the sensor data may also include time stamp data for one or more of the other sensors.

Although sensor data for each type of sensor is located within an individual row of pixels in FIG. 6, in other examples, the sensor data may be represented within a single row of pixels (not shown). For example, the gyroscope data may be embedded in the "Y" space of pixels 6-11, the magnetometer data may be represented in the "Y" space of pixels 12-17, and so forth.

Furthermore, FIG. 6 also shows an example computer-vision data format for a number of image features. For example, a first four-byte image feature is embedded in the "Y" space of the first four pixels of line 16. Additionally, a second, two-byte, image feature is embedded in the "Y" space of pixels 4-5. Other configurations are also contemplated. As discussed above, the computer-vision data may include image features determined using a two-dimensional image and/or image features determined using depth data.

Figure 7:
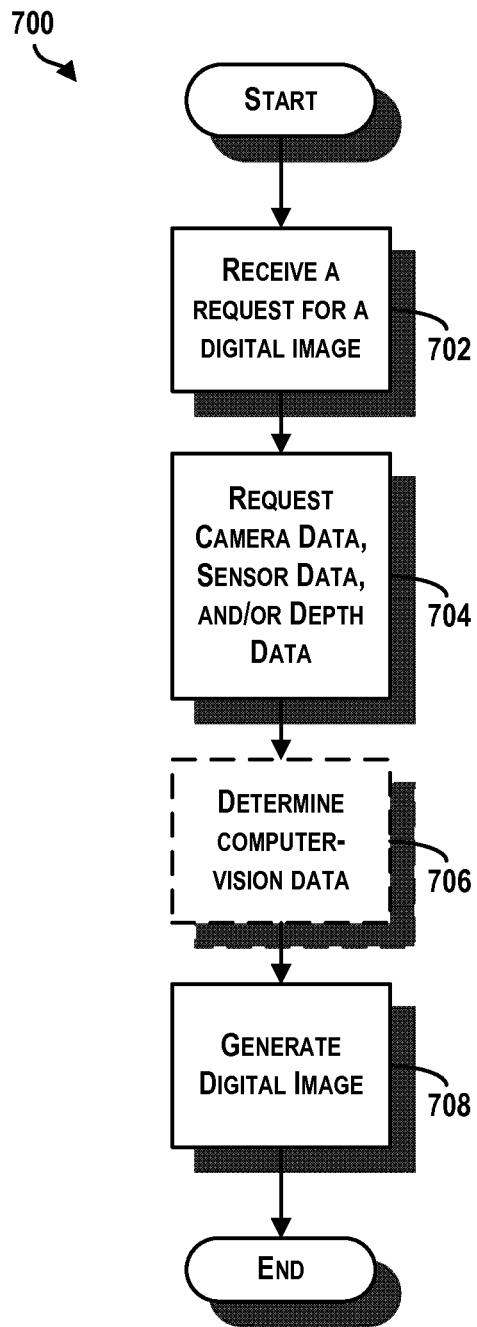
FIG. 7 is a flow chart of an example method for generating a digital image.

Referring now to FIG. 7, a flow chart of an example method 700 for generating a digital image is described. In some examples, one or more of blocks 702-708 may be combined with blocks 402-406 of the method 400 of FIG. 4. For simplicity, the method 700 will be described as being performed by the co-processor 230 of FIG. 2. However, the method 700 may be carried out by any processing unit of a mobile device.

Initially, at block 702, the method 700 includes receiving a request for a digital image from an application processor. In practice, co-processor 230 may receive the request from the application processor 232. In some examples, the request may include information identifying the format of the digital image, or more generally, which types of data to include in the digital image. For instance, the request may be a request for sensor data from the IMU, camera data from a first camera, and camera data from a second camera.

At block 704, in response to receiving the request, co-processor 230 may request one or more of camera data, sensor data, and/or depth data. For example, co-processor 230 may cause at least one camera to capture image data by sending a request to the at least one camera. Additionally, co-processor 230 may cause the depth processor 228 to determine depth data by sending a request to the depth processor. Therefore, the co-processor 230 may determine which sensors or cameras to wake-up/shutdown depending on the request from the application processor.

In response to the requests, co-processor 228 may then receive the camera data, sensor data, and/or depth data. Optionally, at block 706, upon receiving image data, the co-processor 230 may determine computer-vision data. For example, co-processor 230 may process an image to detect one or more image features.

And at block 708, the co-processor 230 may generate the digital image. For instance, the co-processor may generate a digital image including any received image data or depth data, and, as described above, embed any received sensor data in multiple pixels of the digital image as described above.

In some examples, in response to receiving a request from the application processor, the co-processor may periodically generate and send digital images to the application processor until the application processor requests that the co-processor discontinue generation of the digital images. For instance, in response to receiving a request from the application processor, the co-processor may request that at least one camera and one or more sensors periodically send image data and sensor data to the co-processor. The co-processor may then, in response to receiving the image data and sensor data, periodically generate digital images, and send the digital images to the application processor.

In some instances, the co-processor may send a digital image to the application processor once a digital image that includes all of the requested types of data has been generated. In other instances, the co-processor may send a digital image to the application processor upon expiry of a timer (e.g., every 33.3 ms, every tenth of a second, every half second, etc.).

Additionally, in some examples, the systems and methods disclosed herein may allow camera or sensor data to be provided directly from the camera or sensor to the application processor. For instance, in addition to being provided with a generated digital image, the application processor may, in parallel, be provided with camera data in order to provide a preview screen on a display of the mobile device, for example. As another example, accelerometer data may be provided to an application executing on the mobile device and also provided as part of a generated digital image. Therefore, the described systems and methods enable multiple different applications executing on a device to use the same sensor or camera.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a processor of a mobile device, image data from at least one camera of the mobile device and sensor data from an inertial measurement unit (IMU) of the mobile device;
   generating, by the processor, a digital image that includes at least the image data and the sensor data, wherein the sensor data is embedded in pixels of the digital image; and
   providing, by the processor, the digital image to an application processor of the mobile device using a camera bus interface.

2. The method of claim 1, further comprising receiving, by the processor, depth data from a depth processor of the mobile device, wherein the digital image further comprises the depth data.

3. The method of claim 2, wherein pixels of the digital image are provided to the application processor in an order that is determined based on a row of the digital image in which each pixel is located, and the method further comprises:
   determining computer-vision data using the image data, wherein the computer vision data comprises one or more image features of an image,
   wherein the computer-vision data is embedded in pixels of the digital image that are provided to the application processor prior to pixels of the digital image that represent the image data.

4. The method of claim 2, further comprising:
   receiving, by the processor and from the application processer, a request for the digital image; and
   responsive to receiving the request for the digital image:
      the processor causing the at least one camera to capture the image data, and
      the processor causing the depth processor to determine the depth data.

5. The method of claim 2, further comprising determining computer-vision data using the depth data, wherein the computer vision data comprises one or more features of the depth data, wherein generating the digital image further comprises embedding the computer-vision data in multiple pixels of the digital image.

6. The method of claim 1:
   wherein pixels of the digital image are provided to the application processor in an order that is determined based on a row of the digital image in which each pixel is located, and
   wherein the sensor data is embedded in pixels of the digital image that are provided to the application processor prior to pixels of the digital image that represent the image data.

7. The method of claim 1, further comprising determining a time stamp associated with the sensor data, wherein generating the digital image further comprises embedding the time stamp in pixels of the digital image.

8. The method of claim 1, wherein the camera interface comprises a mobile industry processer interface (MIPI).

9. The method of claim 1, wherein the image data from the at least one camera comprises first image data from a first camera and second image data from a second camera, the second camera having a field of view that is greater than 120 degrees.

10. The method of claim 9:
    wherein pixels of the digital image are provided to the application processor in an order that is determined based on a row of the digital image in which each pixel is located, and
    wherein the second image data is located in pixels of the digital image that are provided to the application processor prior to pixels of the digital image that represent the first image data.

11. The method of claim 9, wherein the first camera and the second camera are positioned on a first side of the mobile device and are configured to capture images in the same direction.

12. The method of claim 1, wherein the image data comprises pixels that are defined in a red-green-blue (RGB) color space and the digital image comprises pixels that are defined in a brightness and chrominance (YUV) color space, the method further comprising converting, by the processor, the image data from the RGB color space to the YUV color space.

13. The method of claim 12, wherein the sensor data is embedded in "Y" space of pixels of the digital image.

14. A processing unit in a mobile device, the processing unit comprising:
    data storage; and
    instructions stored in the data storage and executable by the processing unit to perform functions comprising:
       receiving image data from at least one camera of the mobile device and sensor data from an inertial measurement unit (IMU) of the mobile device,
       generating a digital image that includes at least the image data and the sensor data, wherein the sensor data is embedded in pixels of the digital image, and
       providing the digital image to an application processor of the mobile device using a camera bus interface.

15. The processing unit of claim 14, wherein the functions further comprise receiving depth data from a depth processor of the mobile device, wherein the digital image further comprises the depth data.

16. The processing unit of claim 15, wherein the functions further comprise:
    receiving a request for the digital image from the application processer; and
    responsive to receiving the request for the digital image:
       the processing unit causing the at least one camera to capture the image data, and
       the processing unit causing the depth processor to determine the depth data.

17. The processing unit of claim 14, wherein the image data from the at least one camera comprises first image data from a first camera and second image data from a second camera, the second camera having a field of view that is greater than 120 degrees.

18. A mobile device, comprising:
    an application processor;
    at least one camera;
    an inertial measurement unit (IMU); and
    a processor, the processor configured to:
       receive image data from the at least one camera and sensor data from the IMU,
       generate a digital image that includes at least the image data and the sensor data, wherein the sensor data is embedded in pixels of the digital image, and
       provide the digital image to the application processor using a camera bus interface.

19. The mobile device of claim 18, further comprising a depth processor, wherein:
- the depth processor is configured to determine depth data using an infrared projection source and the at least one camera,
- the depth processor is configured to provide the depth data to the processor, and
- the digital image further comprises the depth data.

20. The mobile device of claim 19, wherein the processor is further configured to generate a combined color and depth image using the depth data, wherein the digital image further comprises the combined color and depth image.

21. The mobile device of claim 18, wherein:
- the at least one camera comprises a first camera and a second camera, the second camera having a field of view that is greater than 120 degrees,
- the processor is configured to receive a first image from the first camera and a second image from the second camera, and
- the digital image includes the first image and the second image.

* * * * *